March 28, 1950     J. GORSKI     2,502,088

DEVICE FOR SHAPING SPECTACLE FRAMES

Filed Aug. 22, 1945

INVENTOR
JULIAN GORSKI
BY
ATTORNEY

Patented Mar. 28, 1950

2,502,088

UNITED STATES PATENT OFFICE 2,502,088

DEVICE FOR SHAPING SPECTACLE FRAMES

Julian Gorski, New York, N. Y.

Application August 22, 1945, Serial No. 612,107

5 Claims. (Cl. 81—3.5)

My invention relates generally to optical devices. More particularly my invention is directed toward a novel device for shaping and fitting spectacle frames made of shell or suitable plastic materials.

One of the objects of my invention is to provide an optical device of the character described which is adapted for use in the form of a removable attachment to standard types of optical heaters now currently in use and by means of which the bridge portions as well as other portions of the spectacle frames may be readily and quickly stretched or otherwise altered in shape as desired, the said device being so constructed and arranged as to utilize the heat furnished by the standard heater without in any way destroying the normal use and function of the heater.

Another object of my invention is to provide an optical device of the class described which shall comprise relatively few and simple parts, and which shall be characterized by the ease and facility of its use as well as its high degree of effectiveness for the purposes intended.

Other objects of my invention will hereinafter be pointed out or will become apparent from the detailed description thereof to follow.

In the accompanying drawings.

Figure 2:
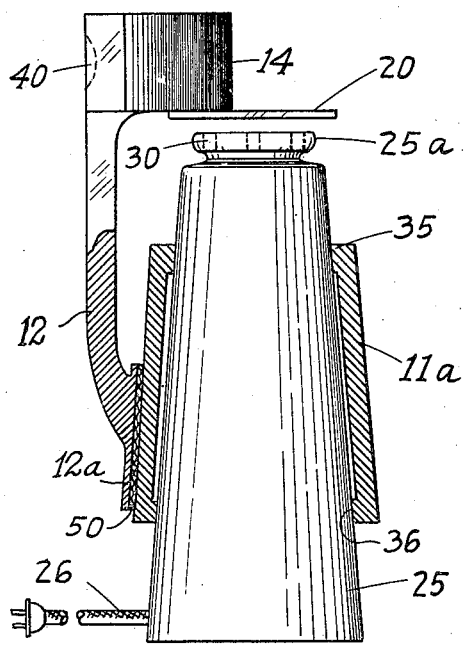
Fig. 2 is a side elevational view, partly in cross-section, of my optical attachment device shown, mounted on a heater for effective use.
Figure 4:
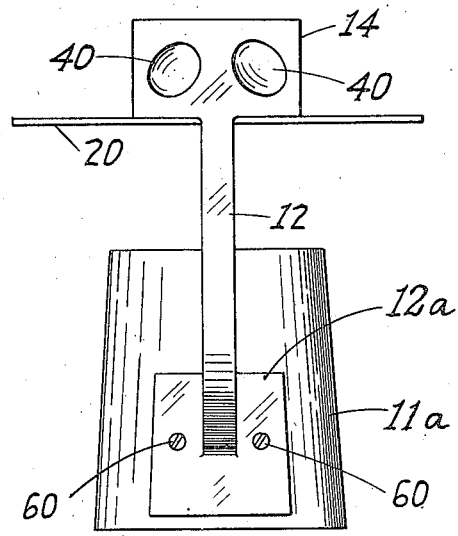
Fig. 4 is a rear elevational view of the optical attachment shown in Fig. 1, but without the heater.

Referring now in detail to the drawings I have shown an optical attachment device 10 constructed and arranged in accordance with my invention and comprising a main body portion 11 of tubular construction, the side wall 11a of which tapers upwardly from the bottom end thereof. Projecting vertically above the top of the main body 11 for a predetermined distance is an arm 12, terminating at its upper end in a substantially triangular shaped relatively thick head 14 and at its lower end in an enlarged flange 12a. The arm 12 is supported on the main body 11 by screws 60 passing through the flange 12a and received in the side wall 11a. It is noted that the base 14a of the head 14 is relatively wider than the arm 12 and that its apex 14b is disposed over the opening of the tubular main body 11.

Attached to the underside of the head 14 by any suitable attaching means and extending laterally on opposite sides thereof is a horizontally disposed work platform 20. It is noted that a center, front portion 20a of the platform 20 is cut away from the outer longitudinal edge inwardly to approximately the apex 14b of the head 14. The purpose and function of this cut away portion 20a will soon become apparent.

Figure 3:
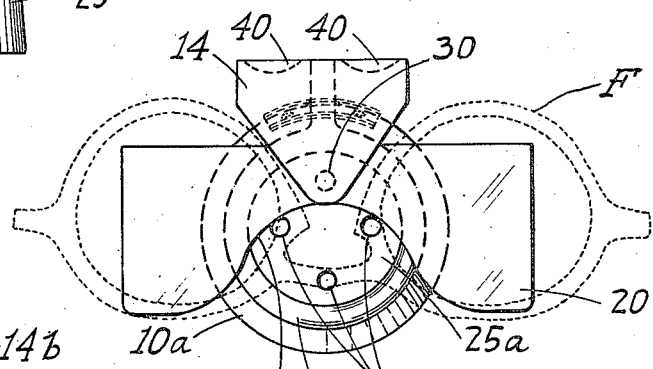
Fig. 3 is a top plan view thereof and additionally illustrating the manner of its use.
Figure 1:
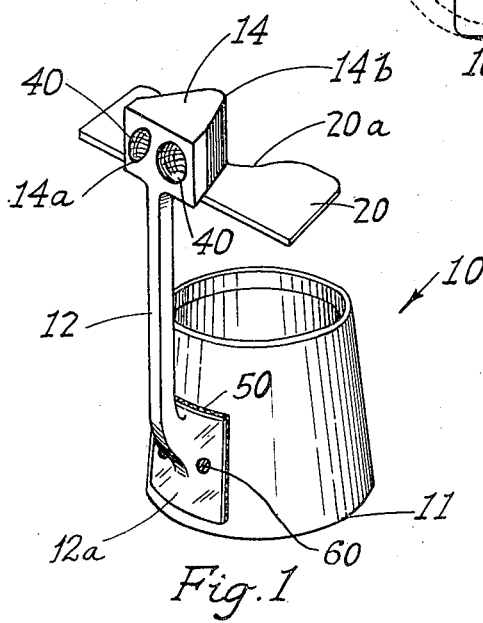
Fig. 1 is an elevational view, in perspective, of an optical heater attachment constructed in accordance with my invention.

It is thus seen from the above description that my optical attachment device is a simple unitary structure. In Figs. 2 and 3 I have shown the optical attachment device of my invention mounted on a standard type of metal heater 25, well known to the trade and currently in use. The said heater may comprise a suitable electrical heating element mounted therein and may be provided with a suitable lead wire 26 fitted with a prong plug member 27 adapted to be connected to any suitable wall receptacle (not shown) to render the heater effective. One such type of heater is disclosed in U. S. Patent No. 1,541,375, dated June 9, 1925. It is noted that the said heater 25 is tapered upwardly from the bottom and in accordance with my invention the main body 11 of the device 10 is correspondingly tapered so that it will be frictionally held on the heater and in such position that the platform 20 will be spaced slightly above the top wall 25a of the heater, as shown in Fig. 2.

The heater 25 is provided with a number of apertures 30 in the top wall 25a through which heated air from the interior of the heater 25 escapes and travels upwardly.

When it is desired to stretch the bridge of a spectacle frame made of shell or other plastic material which is rendered bendable under heat, the said frame, as indicated by the dotted lines F in Fig. 3, is rested on the platform 20 and the portion of the bridge of the frame which is to be stretched or otherwise altered is placed in the path of heated air currents coming from the apertures 30. The heated air currents soften the material of the frame sufficiently to enable the operator to bend the same by hand or to press it against the head 14 as required.

The main body portion 11 may be provided with top and bottom flanges 35 and 36 respectively, to facilitate the frictional engagement with the outer wall of the heater 25, as clearly noted in Fig. 2.

To facilitate the steady handling of the spectacle frame F when it is desired to alter the shape of the bridge or other portions thereof, I provide the rear base surface 14a of the head 14 with a pair of concaved recesses 40 designed to receive therein the tips of the fingers so that pressure may be applied on the bridge of the said frame F against the apex 14b between the thumb and fingers.

It is understood that any suitable type of relatively rigid material, not affected by heat, may be employed for constructing the optical device 10. However, I have found that metallic material gives good results. When metallic or other heat conducting material is used for the tubular portion 11, I prefer to interpose a layer of asbestos 50, or other heat insulating material, between the flange 12a and the outer surface of the wall 11a to insulate the block 14 against the conduction of heat from the heater 25.

Heretofore optical frames made of shell or plastic material had to be manufactured in many different bridge sizes varying from 16 millimeters to 28 millimeters, in addition to a wide variety of eye sizes. It was therefore necessary for the optician to carry large stocks of frames of all bridge sizes to meet all contingencies. By my invention, as above described, the average optician can now eliminate the necessity of carrying such large stocks of frames because he can readily stretch the bridge of his spectacle frames to the required lengths.

It is also possible, by the use of my invention, to bring about an adjustment in the pupillar distance after the eyeglasses have been completed by the optician.

As various possible embodiments might be made of the above invention, and as various changes might be made in the embodiments above set forth, it is understood that all matter herein set forth or shown in the accompanying drawing is to be interpreted as illustrative and not in the limiting sense.

Having described my invention, what I claim and desire to secure by Letters Patent is:

1. In combination, an optical heater having an electrical heating element enclosed in a casing, said casing having an apertured top wall through which heated air from within the casing is adapted to emerge, a removable attachment device comprising a main body portion frictionally removably supported on the outer surface of said casing, a platform member adapted to be disposed in the path of said heated air when said main body portion is in supported position on said casing, means for supporting said platform member on said main body portion, and a block member mounted on said platform of said attachment device, said block member having a wedge-shaped portion against which the bridge portions of spectacle frames may be pressed for the purposes set forth.

2. In combination, an optical heater having an electrical heating element enclosed in a casing, said casing having an apertured top wall through which heated air from within the casing is adapted to emerge, a removable attachment device comprising a tubular main body portion, the inner wall of which is of substantially the same contour in cross-section as that of the outer wall of said casing and adapted to contactively fit thereover and to be frictionally removably supported thereby, a platform member, means comprising an arm interconnecting said platform member with said main body portion for supporting said platform member in the path of said heated air when said main body portion is in supported position on said casing, a block member on said platform, said block member having a portion thereof of wedge-shape against which the bridge portions of spectacle frames may be pressed for the purposes set forth.

3. The combination according to claim 2 in which the surface of said block member opposite to that of the point of said wedge-shaped portion thereof is provided with a concaved area adapted to receive the finger of the user's hand therein to facilitate pressure against the said wedge-shaped portion between the thumb and fingers.

4. The combination according to claim 2 in which the forward edge of said platform member is notched to permit the said heated air currents to pass upwardly therethrough.

5. The combination according to claim 2 in which the said main body portion is made of heat conductive material and in which the means for supporting said platform member comprises an arm interconnecting said main body portion with said block member, the said platform member being attached to said block member and heat insulating means interposed between said block member and said main body portion to prevent heat transferred directly from said casing to said main body portion from reaching said block member.

JULIAN GORSKI.

REFERENCES CITED

The following references are of record in the file of this patent:

UNITED STATES PATENTS

| Number | Name | Date |
|---|---|---|
| 793,158 | Rolfe | June 27, 1905 |
| 1,429,760 | Norquist | Sept. 19, 1922 |
| 1,541,375 | Neuwirth et al. | June 9, 1925 |
| 1,550,386 | Neuwirth et al. | Aug. 18, 1925 |
| 1,609,110 | Brown | Nov. 30, 1926 |
| 1,926,473 | Wood | Sept. 12, 1933 |
| 2,143,246 | McGary | Jan. 10, 1939 |

FOREIGN PATENTS

| Number | Country | Date |
|---|---|---|
| 842,381 | France | Mar. 6, 1939 |